United States Patent
Vasefi et al.

(10) Patent No.: US 10,547,035 B2
(45) Date of Patent: Jan. 28, 2020

(54) OVERCURRENT PROTECTION FOR ENERGY STORAGE AND POWER SUPPLY SYSTEM

(71) Applicant: Goal Zero LLC, Bluffdale, UT (US)

(72) Inventors: Keyvan Vasefi, Payson, UT (US); Michael Roner, Sandy, UT (US); Walker Ford, Holladay, UT (US); Sterling Robison, Bluffdale, UT (US); David M. Smith, Bluffdale, UT (US)

(73) Assignee: GOAL ZERO LLC, Bluffdale, UT (US)

( * ) Notice: Subject to any disclaimer, the term of this patent is extended or adjusted under 35 U.S.C. 154(b) by 192 days.

(21) Appl. No.: 15/661,434

(22) Filed: Jul. 27, 2017

(65) Prior Publication Data

US 2018/0034266 A1 Feb. 1, 2018

Related U.S. Application Data

(60) Provisional application No. 62/368,135, filed on Jul. 28, 2016, provisional application No. 62/368,136, filed on Jul. 28, 2016, provisional application No. 62/368,137, filed on Jul. 28, 2016, provisional application No. 62/368,147, filed on Jul. 28, 2016,
(Continued)

(51) Int. Cl.
| | |
|---|---|
| *H01M 2/10* | (2006.01) |
| *H01G 9/08* | (2006.01) |
| *H01M 10/0525* | (2010.01) |
| *H02J 1/00* | (2006.01) |
| *H02J 7/00* | (2006.01) |
| *H02H 3/08* | (2006.01) |
| *H02H 9/02* | (2006.01) |

(52) U.S. Cl.
CPC ............ *H01M 2/1016* (2013.01); *H01G 9/08* (2013.01); *H01M 10/0525* (2013.01); *H02H 3/08* (2013.01); *H02H 9/02* (2013.01); *H02J 1/00* (2013.01); *H02J 7/007* (2013.01); *H02J 7/0063* (2013.01); *H02J 2001/008* (2013.01)

(58) Field of Classification Search
USPC .................................. 361/86–87, 93.7–93.9
See application file for complete search history.

(56) References Cited

U.S. PATENT DOCUMENTS

| | | |
|---|---|---|
| 8,080,972 B2 | 12/2011 | Smith |
| 8,081,410 B1 | 12/2011 | Wang et al. |
| 9,024,570 B2 | 5/2015 | Workman et al. |

(Continued)

FOREIGN PATENT DOCUMENTS

| | | |
|---|---|---|
| WO | WO-2011/106431 A2 | 9/2011 |
| WO | WO-2017/118922 | 7/2017 |

*Primary Examiner* — Danny Nguyen
(74) *Attorney, Agent, or Firm* — Foley & Lardner LLP

(57) ABSTRACT

An energy and power supply device includes an energy storage unit configured to store electrical energy, an output coupled to the energy storage unit and configured to provide an output electrical current to a load, and a current limiting system configured to selectively limit the output electrical current according to a current protection profile. The current protection profile includes a plurality of threshold currents and a plurality of corresponding threshold periods of time that facilitate providing the output electrical current according to a maximum variable current versus time function.

8 Claims, 4 Drawing Sheets

Related U.S. Application Data provisional application No. 62/368,150, filed on Jul. 28, 2016.

(56) References Cited

U.S. PATENT DOCUMENTS

| | | | |
|---|---|---|---|
| 9,312,706 B2 | 4/2016 | Workman et al. | |
| 9,385,351 B2 | 7/2016 | Workman et al. | |
| 9,388,953 B2 | 7/2016 | Workman et al. | |
| 9,515,500 B2 | 12/2016 | Workman et al. | |
| 9,553,481 B2 | 1/2017 | Prommel et al. | |
| 2003/0142449 A1* | 7/2003 | Iwata | H02H 1/0015 361/58 |
| 2012/0127621 A1* | 5/2012 | Knapp, Jr. | H02H 3/093 361/94 |
| 2013/0043826 A1 | 2/2013 | Workman et al. | |
| 2015/0380709 A1 | 12/2015 | Mizrahi | |
| 2017/0040801 A1 | 2/2017 | Robison et al. | |
| 2017/0040932 A1 | 2/2017 | Lillywhite et al. | |
| 2017/0047755 A1 | 2/2017 | Workman et al. | |

* cited by examiner

OVERCURRENT PROTECTION FOR ENERGY STORAGE AND POWER SUPPLY SYSTEM

CROSS-REFERENCE TO RELATED PATENT APPLICATIONS

This application claims the benefit of U.S. Provisional Patent Application No. 62/368,135, filed Jul. 28, 2016, U.S. Provisional Patent Application No. 62/368,136, filed Jul. 28, 2016, U.S. Provisional Patent Application No. 62/368,137, filed Jul. 28, 2016, U.S. Provisional Patent Application No. 62/368,147, filed Jul. 28, 2016, and U.S. Provisional Patent Application No. 62/368,150, filed Jul. 28, 2016, all of which are incorporated herein by reference in their entireties.

BACKGROUND

An energy storage and power supply device may be used to store power in an energy storage unit. The energy storage unit may store power from a power supply device and provide power to an external device. The power for the external device may be provided at one or more outputs of the energy storage and power supply device.

SUMMARY

One embodiment relates to an energy storage and power supply device. The energy and power supply device includes an energy storage unit configured to store electrical energy, an output coupled to the energy storage unit and configured to provide an output electrical current to a load, and a current limiting system configured to selectively limit the output electrical current according to a current protection profile. The current protection profile includes a plurality of threshold currents and a plurality of corresponding threshold periods of time that facilitate providing the output electrical current according to a maximum variable current versus time function.

Another embodiment relates to an energy storage and power supply device. The energy and power supply device includes an energy storage unit configured to store electrical energy, an output coupled to the energy storage unit and configured to provide an output electrical current to a load device, a regulator positioned along a current flow path between the energy storage unit and the output, and a processing circuit. The processing circuit is configured to at least one of (i) access a plurality of current set points, each of the current set points including a respective threshold current and a corresponding threshold period of time and (ii) determine a respective threshold current based on a corresponding threshold period of time; monitor the output electrical current; and send a signal to the regulator to terminate the output electrical current in response to the output electrical current exceeding the respective threshold current for longer than the corresponding threshold period of time for at least one of the current set points.

Still another embodiment relates to a method for controlling an electrical output current from an energy storage unit at an output of an energy storage and power supply device. The method includes providing, by the energy storage unit, the output electrical current to the output of the energy storage and power supply device; and selectively limiting, by a current limiting system of the energy storage and power supply device, the output electrical current according to a current protection profile. The current protection profile includes a plurality of threshold currents and a plurality of corresponding threshold periods of time that facilitate providing the output electrical current according to a maximum variable current versus time function.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
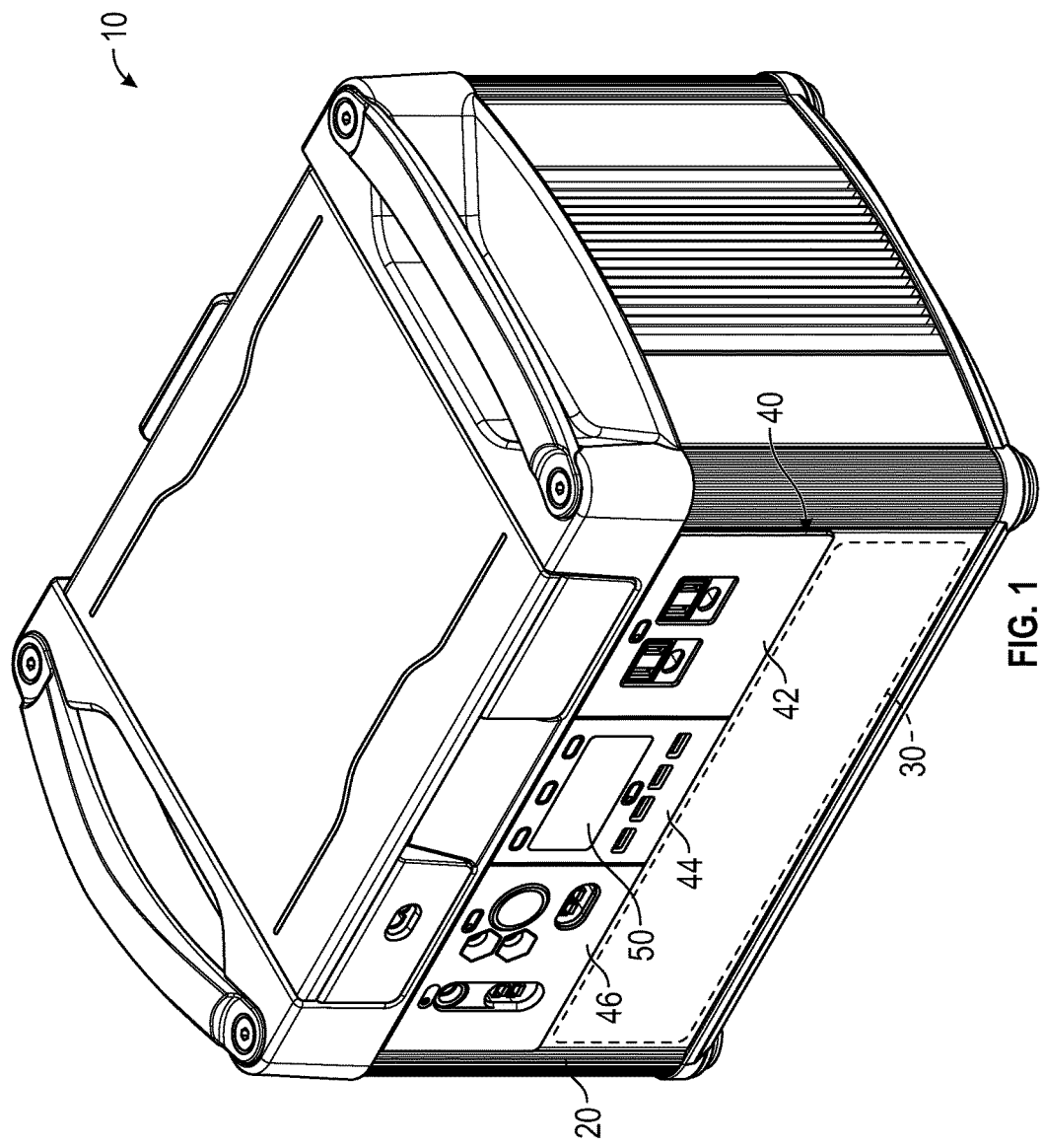
FIG. 1 is a front perspective view of an energy storage and power supply device, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Electrical energy may be transmitted from a power supply device to an energy storage and power supply device for storage in an energy storage unit (e.g., a battery including one or more cells, etc.). The electrical energy may be transmitted from the energy storage and power supply device to various loads devices. By way of example, the energy storage and power supply device may include one or more outputs with which a load device interacts (e.g., using a power cable, etc.) to receive electrical energy. The current provided by the energy storage and power supply device and/or drawn by the load device may vary. By way of example, certain load devices may draw an elevated current level for in initial or startup period of time and thereafter draw a reduced current level.

According to an exemplary embodiment, the energy storage and power supply device includes multi-stage overcurrent protection on the one or more outputs. In one embodiment, the energy storage and power supply device includes an overcurrent protection circuit (e.g., a hardware overcurrent protection circuit, etc.) and a software protection (e.g., a software-based protection, etc.) on the one or more outputs. In other embodiments, the energy storage and power supply device includes a plurality of overcurrent protection circuits and/or a plurality of software protections on the one or more outputs. The overcurrent protection circuit and/or the software protections may be configured to selectively terminate the current flow at the one or more outputs (e.g., to protect the energy storage unit, to protect other electronic components of the energy storage and power supply device, etc.).

The overcurrent protection circuit and/or the software protections on the one or more outputs may be configured to provide a current protection curve or a current protection profile that permits one or more threshold current levels for one or more threshold periods of time (e.g., rather than one or more hard stop points, rather than terminating the flow of current at the output in response to exceeding one or more threshold currents even briefly, etc.). The energy storage and power supply device may thereby accommodate various load devices having current draws that surge at start-up and/or at some point during operation but decrease during normal operation (e.g., an air conditioning unit having a condenser or other component requiring a greater current during startup than during normal operation, etc.). In some embodiments, the current protection curve or the current protection profile is applied separately to alternating current ("AC") outputs and direct current ("DC") outputs of the energy storage and power supply device.

Figure 2:
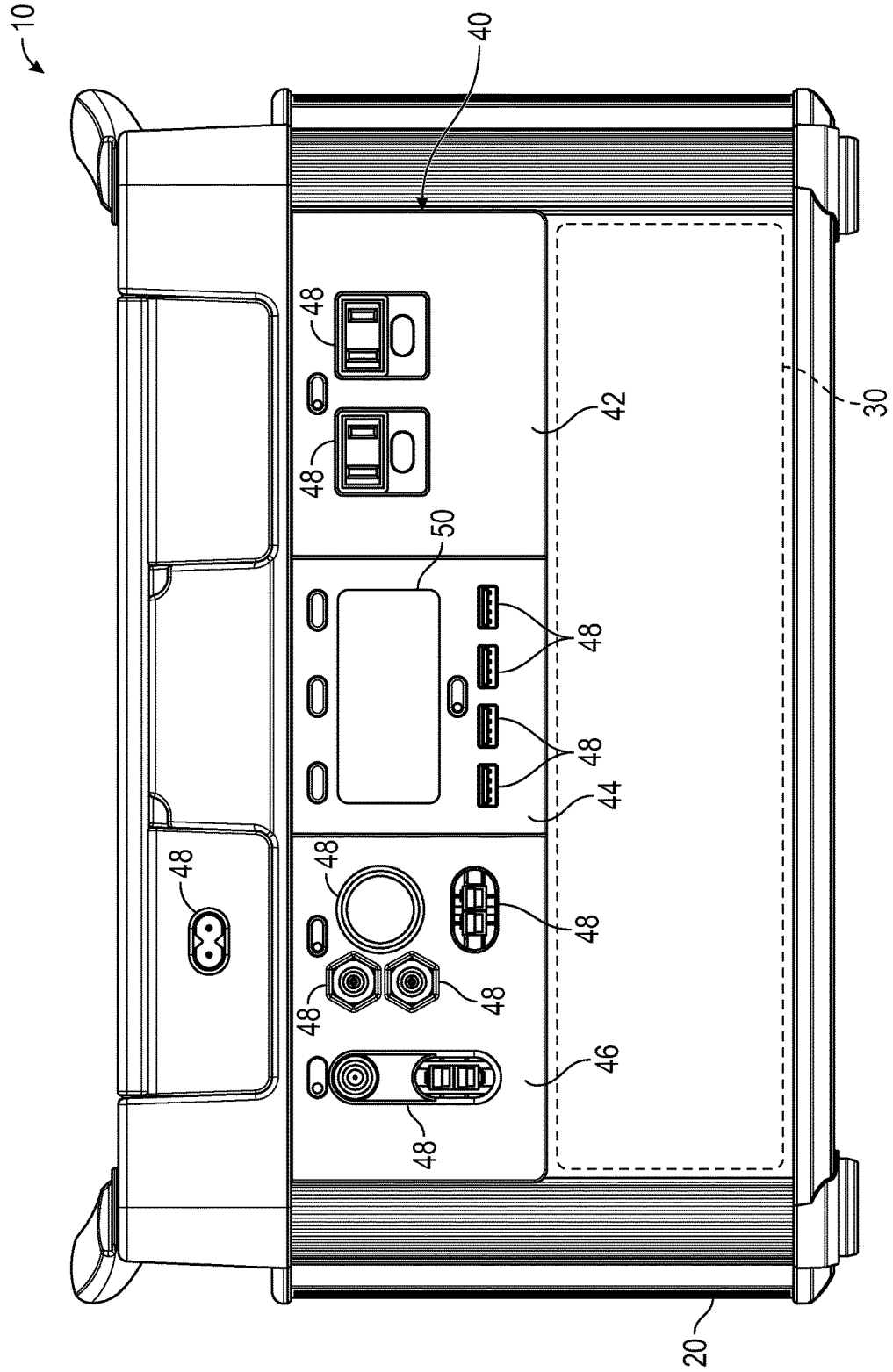
FIG. 2 is a front view of the energy storage and power supply device of FIG. 1, according to an exemplary embodiment.

According to the exemplary embodiment shown in FIGS. 1 and 2, an energy storage and power supply device (e.g., a solar generator, a hybrid combustion and solar generator, etc.), shown as energy storage and power supply device 10, is configured to receive and store electrical power from a power source for future use (e.g., in a remote location where electricity is not readily available, during a power outage, etc.). The power source may include a solar panel system, a combustion generator (e.g., a gasoline-fueled generator, etc.), a power supply (e.g., a 120 Volt ("V") wall charger, a 220V wall charger, a 240V wall charger, etc.), and/or a 12V car adapter. The stored electrical power may be provided to a load device (e.g., a smartphone, a tablet, an E-reader, a computer, a laptop, a smartwatch, a portable and rechargeable battery pack, appliances, refrigerators, lights, display monitors, televisions, etc.) to at least one of charge and power the load device.

As shown in FIGS. 1 and 2, the energy storage and power supply device 10 includes a housing, shown as housing 20. As shown in FIGS. 1 and 2, the energy storage and power supply device 10 includes an energy storage unit, shown as battery 30. According to an exemplary embodiment, the housing 20 defines an internal cavity of the energy storage and power supply device 10 that receives the battery 30. The battery 30 may include one or more lithium-ion cells. In some embodiments, the battery 30 includes a plurality of batteries (e.g., two or more batteries connected in series, etc.). In some embodiments, the battery 30 additionally or alternatively includes another type of battery (e.g., a lead-acid battery, etc.) or energy storage unit (e.g., one or more capacitors, etc.).

As shown in FIGS. 1 and 2, the energy storage and power supply device 10 includes an interface, shown as user interface 40. As shown in FIG. 2, the user interface 40 includes a first portion, shown as first panel 42, a second portion, shown as second panel 44, and a third portion, shown as third panel 46. As shown in FIG. 2, the first panel 42 includes a first plurality of interfaces, the second panel 44 includes a second plurality of interfaces, and the third panel 46 includes a third plurality of interfaces, shown as input/output ("I/O") ports 48. The I/O ports 48 are electrically coupled to the battery 30, according to an exemplary embodiment. According to an exemplary embodiment, (i) at least a portion of the I/O ports 48 are configured to receive electrical energy from a power source (e.g., a solar panel system, a combustion generator, a power supply, a 12V car adapter, etc.) for storage by the battery 30, (ii) at least a portion of the I/O ports 48 are configured to provide the stored electrical energy within the battery 30 to a load device (e.g., a smartphone, a tablet, an E-reader, a computer, a laptop, a smartwatch, a portable and rechargeable battery pack, appliances, a refrigerator, lights, display monitors, televisions, etc.) with a power and/or charging cable connected therebetween, and/or (iii) at least a portion of the I/O ports 48 are configured to receive and provide electrical energy (e.g., operate as dual functioning ports, etc.).

According to the exemplary embodiment shown in FIG. 2, the I/O ports 48 of the first panel 42, the second panel 44, and the third panel 46 include alternating current ("AC") inverter ports (e.g., having a 110V outlet port, etc.), direct current ("DC") inputs and/or outputs, USB ports, a 6 millimeter ("mm") port, a 12V car port, a 12V powerpole port (e.g., an Anderson Powerpole, etc.), a charging port (e.g., a solar panel charging port, a combustion generator charging port, a power supply charging port, a powerpole charging port, etc.), and/or a chaining port (e.g., to electrically couple two or more of the energy storage and power supply devices 10 in series or parallel, a powerpole chaining port, etc.).

As shown in FIG. 2, the second panel 44 includes a display, shown as display 50. The display 50 may provide various information regarding the state and/or operation of the energy storage and power supply device 10 and/or the battery 30 (e.g., a battery level, a current input power, a current input voltage, a current input current, a current output power, a current output voltage, a current output current, an estimated time until a full charge of the battery 30 is reached, an estimated time until full and/or permitted depletion of the battery 30 is reached, a battery temperature, an insignia, a notification, a warning, etc.).

Figure 3:
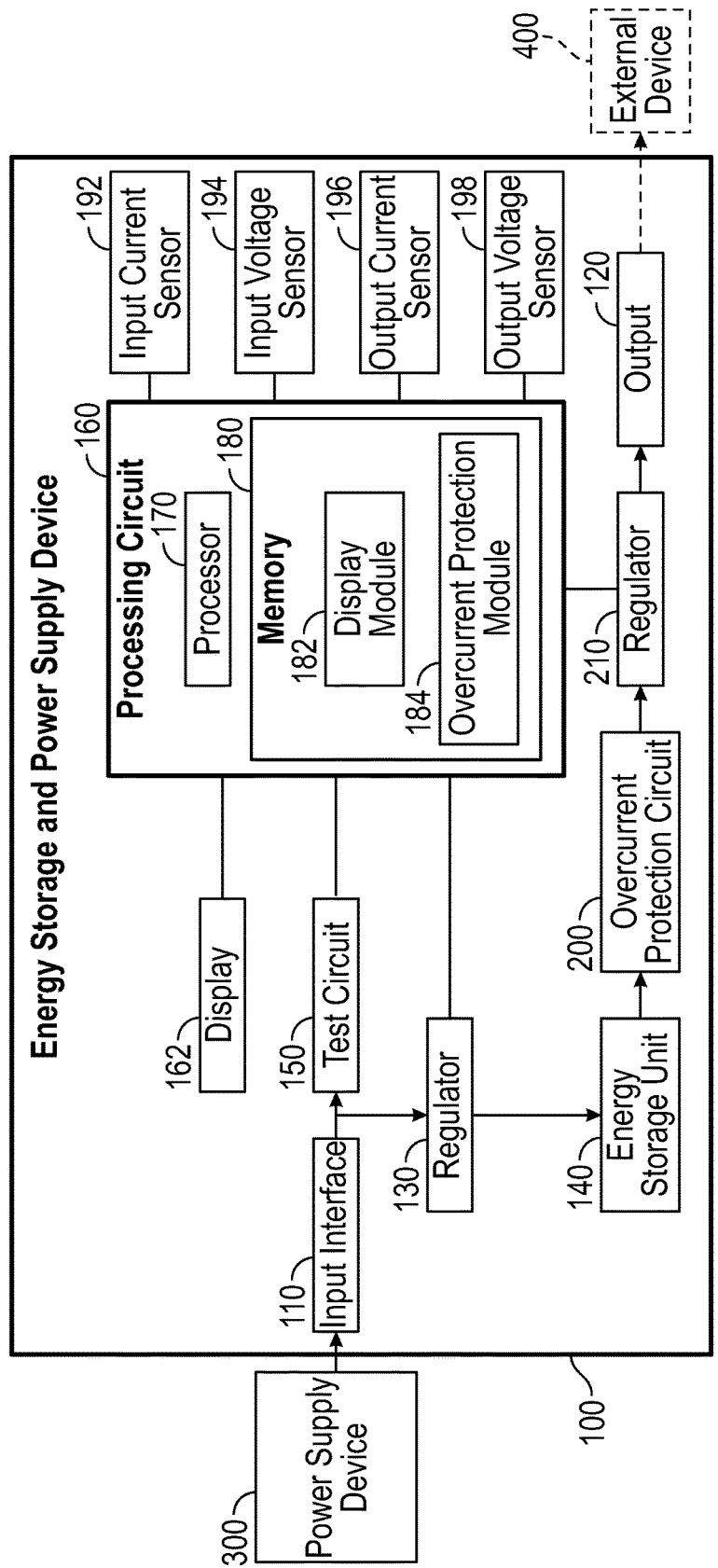
FIG. 3 is a schematic diagram of the energy storage and power supply device of FIG. 1, coupled to a power supply device and an external device, according to an exemplary embodiment.

According to the exemplary embodiment shown in FIG. 3, an energy storage and power supply device 100 (e.g., the energy storage and power supply device 10, etc.) is configured to receive electrical power from a device, shown as power supply device 300. The power supply device 300 may be a photovoltaic cell, an array of photovoltaic cells (e.g., solar panel, etc.), a generator (e.g., electrical generator, a combustion generator, etc.), and/or an energy storage unit (e.g., a battery, capacitor, etc.), among other alternatives. The energy storage and power supply device 100 includes an input, shown as input interface 110, and an output, shown as output 120. Any of the I/O ports 48 may provide electrical energy to and/or receive electrical energy from the input interface 110 and/or the output 120. The input interface 110 is configured to receive electrical energy from the power supply device 300. The output 120 is configured to transmit electrical energy to a device (e.g., a phone, a tablet, a computer, a portable and rechargeable battery pack, etc.), shown as external device 400. The external device 400 may be at least one of charged and powered by the energy storage and power supply device 100.

The energy storage and power supply device 100 further includes a regulator (e.g., a switching regulator, etc.), shown as regulator 130, and an energy storage unit (e.g., the battery 30, a capacitor, etc.), shown as energy storage unit 140. The regulator 130 may be configured to alter a voltage provided at the input interface 110 for application to the energy storage unit 140. In other embodiments, the energy storage and power supply device 100 does not include the regulator 130. The energy storage unit 140 may include one or more lithium-ion cells. In other embodiments, the energy storage unit 140 is or includes another device configured to store energy.

According to the exemplary embodiment shown in FIG. 3, the input interface 110 is coupled to a circuit, shown as test circuit 150. The test circuit 150 may draw current from the power supply device 300 in a variable manner. In other embodiments, the energy storage and power supply device 100 does not include the test circuit 150.

As shown in FIG. 3, the energy storage and power supply device 100 includes a processing circuit 160. The processing circuit 160 is coupled to various components of the energy storage and power supply device 100. In one embodiment, the processing circuit 160 is configured to send and receive information (e.g., current data, voltage data, electrical power data, etc.) to and/or from various components of the energy storage and power supply device 100.

According to an exemplary embodiment, the processing circuit 160 is coupled to the regulator 130 and the test circuit 150. In one embodiment, the processing circuit 160 is configured to provide commands to the test circuit 150 such that the test circuit 150 draws more or less current from the power supply device 300 and thereafter determine a maximum available input power associated with the power supply device 300. The processing circuit 160 may be configured to control the charging power applied to the energy storage unit 140 (e.g., by controlling the regulator 130, etc.) and/or control the output power at the output 120 (e.g., by controlling the regulation of the voltage at the output 120, etc.) such that the charging power and/or the output power approach or equal the maximum available input power associated with the power supply device 300.

The processing circuit 160 includes a processor, shown as processor 170, and a memory (e.g., RAM, ROM, Flash Memory, hard disk storage, etc.), shown as memory 180. The processor 170 may be implemented as a general-purpose processor, an application specific integrated circuit ("ASIC"), one or more field programmable gate arrays ("FPGAs"), a digital signal processor ("DSP"), a group of processing components, or other suitable electronic processing components. The memory 180 may include multiple memory devices. The memory 180 may store data and/or computer code for facilitating the various processes described herein. Thus, the memory 180 may be communicably connected to the processor 170 and provide computer code or instructions to the processor 170 for executing the processes described in regard to the processing circuit 160 herein. Moreover, the memory 180 may be or include tangible, non-transient volatile memory or non-volatile memory. Accordingly, the memory 180 may include database components, object code components, script components, or any other type of information structure for supporting the various activities and information structures described herein.

The memory 180 includes various modules for completing the activities described herein. According to an exemplary embodiment, the processing circuit 160 includes a first module, shown as display module 182 and a second module, shown as overcurrent protection module 184. In other embodiments, the processing circuit 160 includes additional, fewer, and/or different modules. The display module 182 and the overcurrent protection module 184 may be configured to receive inputs relating to various data and/or information (e.g., current data, voltage data, electrical power data, etc.) and provide output signals. In one embodiment, the processing circuit 160 analyzes the output signals (e.g., with the processor 170, etc.) and controls one or more components of the energy storage and power supply device 100.

The processing circuit 160 is coupled to a number of sensors (e.g., gauges, meters, etc.), according to the exemplary embodiment shown in FIG. 3. The sensors may be associated with the input interface 110, the output 120, the energy storage unit 140, the power supply device 300, and/or the external device 400. According to the exemplary embodiment shown in FIG. 3, the processing circuit 160 is coupled to a first sensor, shown as input current sensor 192 (e.g., positioned to monitor a current of the electrical power provided to the input interface 110 from the power supply device 300, etc.), a second sensor, shown as input voltage sensor 194 (e.g., positioned to monitor a voltage of the electrical power provided to the input interface 110 from the power supply device 300, etc.), a third sensor, shown as output current sensor 196 (e.g., positioned to monitor a current of the electrical power provided to the output 120 and/or the external device 400, etc.), and a fourth sensor, shown as output voltage sensor 198 (e.g., positioned to monitor a voltage of the electrical power provided to the output 120 and/or the external device 400, etc.). In other embodiments, the processing circuit 160 includes a different combination of sensors and/or still other types of sensors. In still other embodiments, the processing circuit 160 includes a combination of electrical components (e.g., diodes, resistors, capacitors, etc.) that replace and/or supplement at least one of the input current sensor 192, the input voltage sensor 194, the output current sensor 196, and the output voltage sensor 198.

According to the exemplary embodiment shown in FIG. 3, the energy storage and power supply device 100 includes a circuit, shown as overcurrent protection circuit 200. In one embodiment, the overcurrent protection circuit 200 is a hardware overcurrent protection circuit including a plurality of electrical components that cooperate to provide overcurrent protection. As shown in FIG. 3, a current flow may be provided from the energy storage unit 140 to the output 120. In one embodiment, the overcurrent protection circuit 200 is disposed along a current flow path between the energy storage unit 140 and the output 120. By way of example, the overcurrent protection circuit 200 may be configured to receive electrical energy from the energy storage unit 140 and selectively transmit electrical energy to the output 120.

The overcurrent protection circuit 200 may be configured to selectively terminate the current flow to the output 120. In one embodiment, the overcurrent protection circuit 200 is configured to selectively terminate the current flow at the output 120 independently (e.g., without relying on and/or receiving command signals from the processing circuit 160, etc.). In other embodiments, the overcurrent protection circuit 200 is coupled to (e.g., communicates with, etc.) the processing circuit 160. In one embodiment, the energy storage and power supply device 100 (e.g., the overcurrent protection circuit 200, etc.) is configured to wait a period of time after terminating the current flow to the output 120 before again permitting the flow of current to the output 120.

According to an exemplary embodiment, the overcurrent protection circuit 200 includes one or more current limiters. By way of example, the current limiters may include one or more electrical components arranged to provide the overcurrent protection outlined herein. A threshold current level and a threshold period of time may be associated with each of the current limiters. The current limiters may be configured to terminate the current flow to the output 120 in response to the current flow at the output 120 (e.g., the current draw by the external device 400, etc.) exceeding the threshold current level for a duration that reaches or exceeds the threshold period of time. In other embodiments, the overcurrent protection circuit 200 includes one current limiter configured to terminate the current flow to the output 120 in response to the current flow at the output 120 exceeding one of various threshold current levels for a duration that reaches or exceeds corresponding threshold periods of time. The overcurrent protection circuit 200 may facilitate operating the energy storage and power supply device 100 according to a variable maximum current versus time function.

By way of example, the overcurrent protection circuit 200 may include a first current limiter having a threshold current level of 10 Amperes ("Amps"), a second current limiter having a threshold current level of 25 Amps, and a third current limiter having a threshold current level of 50 Amps. The first current limiter, having threshold current level of 10 Amps, may have a threshold period of time of 100 seconds. The second current limiter, having a threshold current level of 25 Amps, may have a threshold period of time equal to 20 seconds. The third current limiter, having a threshold current level of 50 Amps, may have a threshold period of time equal to 2 seconds. The one or more current limiters may thereby cooperate to provide overcurrent protection at the output 120 according to a current protection curve or a current protection profile (e.g., defined by the series of steps or threshold currents and corresponding threshold periods of time, etc.). One exemplary current protection curve or current protection profile is provided below. In other embodiments, the overcurrent protection circuit 200 has more or fewer current limiters and/or the current limiters have different threshold current level and/or threshold period of time settings.

| Current Limiter | Threshold Current Level | Threshold Period of Time |
| --- | --- | --- |
| First | 10 Amps | 100 Seconds |
| Second | 25 Amps | 20 Seconds |
| Third | 50 Amps | 2 Seconds |

During use of the energy storage and power supply device 100, the current flow at the output 120 (e.g., the current draw by the external device 400, etc.) may vary. By way of example, the current flow at the output 120 may be 55 Amps during an initial startup period of the external device 400 (e.g., for a startup period of time of 5 seconds, etc.). The 55 Amp current draw during the initial startup period may exceed the threshold current level of the first current limiter (e.g., 10 Amps, etc.), the second current limiter (e.g., 25 Amps, etc.), and the third current limiter (e.g., 50 Amps, etc.). Because the 55 Amp current draw exceeds the 50 Amp threshold current level of the third current limiter, the third current limiter is configured to terminate the flow of current to the output 120 in response to the initial startup period exceeding the 2 second threshold period of time associated with the third current limiter, according to one example. In other words, the third current limiter may thereby continue to permit the flow of current to the output 120 until the 50 Amp threshold current level is exceeded for 2 or more seconds.

The third current limiter may also continue to permit the flow of current to the output 120 in response to the 55 Amp current draw falling below the 50 Amp threshold current level. While the 25 Amp and 10 Amp threshold current levels of the second current limiter and the first current limiter, respectively, would also be exceeded by the exemplary 55 Amp current draw, the second current limiter and the first current limiter may not terminate the flow of current to the output 120 where the third current limiter has already done so (i.e., the threshold periods of time for the second current limiter and the first current limiter may not be reached before the flow of current is terminated by the third current limiter, etc.). In other embodiments, each of the current limiters engage to interrupt the flow of current to the output 120 in response to flow of current exceeding their respective threshold current levels for the corresponding threshold periods of time.

While the third current limiter may be configured to not interrupt the flow of current in response to the exemplary 55 Amp current draw falling below the 50 Amp threshold current level within 2 seconds, the second current limiter may be configured to terminate the current flow in response to the current draw exceeding 25 Amps for a period of 10 seconds. By way of example, the second current limiter may be configured to terminate the current flow to the output 120 in response to a current draw of 55 Amps for a period of 1 second and a current draw of 30 Amps for 9 seconds. In other words, the threshold periods of time for the various current limiters may begin to elapse simultaneously where the current draw exceeds the corresponding threshold current levels.

While the foregoing example describes an exemplary current draw during an initial startup period of time, the overcurrent protection circuit 200 may be configured to terminate the flow of current to the output 120 at any point during use of the energy storage and power supply device 100 in response to a current draw exceeding any one of the threshold current levels for the threshold periods of time (e.g., the threshold periods of time initializing at any point during the use of the energy storage and power supply device 100, etc.). In still other embodiments, the overcurrent protection circuit 200 is otherwise configured to terminate the flow of current to the output 120 based on current draw and time (e.g., in response to an integral of a current draw versus time profile exceeding a threshold level, using an algorithm, etc.).

In response to the current flow at the output 120 initially exceeding the threshold current and thereafter falling below the threshold current level (falling below the threshold current level within the threshold period of time), the current limiters of the overcurrent protection circuit may be configured to "reset." The current limiters may be configured to terminate the flow of current at the output 120 in response to the current flow at the output 120 again exceeding the threshold current for the threshold period of time (i.e., the current limiter is configured to terminate the flow of current at the output 120 in response to the threshold current level continuously exceeding the threshold period of time). In other embodiments, the threshold period of time is or includes a period of time that may be exceeded within one or more time windows. By way of example, a current limiter may be configured to terminate the flow of current at the output 120 in response to the current draw exceeding a threshold current level of 25 Amps for a threshold time period of 20 seconds within the previous 60 seconds. Such a current limiter may provide overcurrent protection despite momentary reductions in the current draw and/or a current draw profile that, in the aggregate, could result in damage to one or more components of the energy storage and power supply device 10.

By way of example, the current flow at the output 120 may be 55 Amps during an initial startup period of the external device 400. The 55 Amp current draw during the initial startup period may exceed the threshold current level of the first current limiter (e.g., 10 Amps, etc.), the second current limiter (e.g., 25 Amps, etc.), and the third current limiter (e.g., 50 Amps, etc.). Because the 55 Amp current draw exceeds the 50 Amp threshold current level of the third current limiter, the third current limiter is configured to terminate the flow of current to the output 120 in response to the initial startup period exceeding the 2 second threshold period of time associated with the third current limiter, according to one example. The third current limiter may thereby continue to permit the flow of current to the output 120 until the 50 Amp threshold current level is exceeded for 2 or more seconds.

In other embodiments, one or more of the current limiters has a threshold period of time equal to zero. In other words, when the threshold current level of the current limiter is reached or exceeded, the current limiter is configured to immediately terminate the current flow to and/or from the output 120. One or more of the current limiters may thereby operate as a traditional hard stop point, terminating the flow of current at the output 120 if the current flow at the output 120 (e.g., the current draw by the external device 400, etc.) exceeds the threshold current level even briefly.

According to various embodiments, at least one of the current limiter and the overcurrent protection circuit 200 includes a fuse. In other embodiments, the overcurrent protection circuit 200 includes operational amplifiers, amplifiers, resistors, and/or other electronic components. In still other embodiments, the overcurrent protection circuit 200 includes a fuse circuit. The fuse circuit may include one or more polymeric positive temperature coefficient devices (e.g., resettable fuses, polyfuses, polyswitches, etc.). The fuse circuit may include a switching circuit that selectively routes electrical energy to one of a number of fuse circuits where each of the fuse circuits includes a polymeric positive temperature coefficient device that is different from the other polymeric positive temperature coefficient devices. In this way, the overcurrent protection circuit 200 may adjust the current limiters to tailor the overcurrent protection circuit 200 for a target application.

According to the exemplary embodiment shown in FIG. 3, the energy storage and power supply device 100 includes a regulator, shown as regulator 210. By way of example, the regulator 210 may include a switch. As shown in FIG. 3, a current flow may be provided from the energy storage unit 140 to the output 120. In one embodiment, the regulator 210 is disposed along a current flow path between the energy storage unit 140 and the output 120. By way of example, the regulator 210 may be configured to receive electrical energy from the energy storage unit 140 and selectively transmit electrical energy to the output 120. The energy storage and power supply device 100 may include either or both of the overcurrent protection circuit 200 and the regulator 210.

In one embodiment the processing circuit 160 (e.g., the overcurrent protection module 184, etc.) is configured to engage the regulator 210 to selectively terminate the flow of current to the output 120. In one embodiment, the energy storage and power supply device 100 (e.g., the processing circuit 160, etc.) is configured to wait a period of time after terminating the current flow to the output 120 before again permitting the flow of current to the output 120 (e.g., by again engaging the regulator 210, etc.). In other embodiments, the processing circuit 160 is configured to engage the overcurrent protection circuit 200 to selectively terminate the flow of current to the output 120. The overcurrent protection module 184 may be configured to monitor the current flow at the output 120 (e.g., based on data provided by the output current sensor 196, etc.) and provide signals such that the processing circuit 160 selectively terminates the flow of current to the output 120. The processing circuit 160 (e.g., the overcurrent protection module 184, etc.) may thereby be configured to provide software protection, software-based overcurrent protection, firmware current limiting control, etc.

According to an exemplary embodiment, the overcurrent protection module 184 includes one or more current set points. A threshold current level and a threshold period of time may be associated with each of the current set points. The overcurrent protection module 184 may be configured to terminate the current flow to the output 120 in response to the current flow at the output 120 (e.g., the current draw by the external device 400, etc.) exceeding the threshold current level for a duration that reaches or exceeds the threshold period of time. In one embodiment, the overcurrent protection module 184 includes a timer module configured to monitor the duration that the current flow at the output has exceeded the one or more threshold current levels. The overcurrent protection module 184 may facilitate operating the energy storage and power supply device 100 according to a variable maximum current versus time function.

By way of example, the overcurrent protection module 184 may include a first current set point having a threshold current level of 10 Amperes ("Amps"), a second current set point having a threshold current level of 25 Amps, and a third current set point having a threshold current level of 50 Amps. The first current set point, having threshold current level of 10 Amps, may have a threshold period of time of 100 seconds. The second current set point, having a threshold current level of 25 Amps, may have a threshold period of time equal to 20 seconds. The third current set point, having a threshold current level of 50 Amps, may have a threshold period of time equal to 2 seconds. The overcurrent protection module 184 may thereby provide overcurrent protection at the output 120 according to a current protection curve or a current protection profile (e.g., defined by the series of steps or threshold currents and corresponding threshold periods of time, etc.). One exemplary current protection curve or current protection profile is provided below. In other embodiments, the overcurrent protection module 184 has more or fewer current set points and/or the current set points have different threshold current level and/or threshold period of time settings.

| Current Set Point | Threshold Current Level | Threshold Period of Time |
|---|---|---|
| First | 10 Amps | 100 Seconds |
| Second | 25 Amps | 20 Seconds |
| Third | 50 Amps | 2 Seconds |

During use of the energy storage and power supply device 100, the current flow at the output 120 (e.g., the current draw by the external device 400, etc.) may vary. By way of example, the current flow at the output 120 may be 55 Amps during an initial startup period of the external device 400. The 55 Amp current draw during the initial startup period may exceed the threshold current level of the first current set point (e.g., 10 Amps, etc.), the second current set point (e.g., 25 Amps, etc.), and the third current set point (e.g., 50 Amps, etc.). Because the 55 Amp current draw exceeds the 50 Amp threshold current level of the third current set point, the overcurrent protection module 184 and/or the processing circuit 160 may be configured to engage the regulator 210 to terminate the flow of current to the output 120 in response to the initial startup period exceeding the 2 second threshold period of time associated with the third current set point, according to one example. In other words, the processing circuit 160 may thereby continue to permit the flow of current to the output 120 until the 50 Amp threshold current level of the third current set point is exceeded for 2 or more seconds. The processing circuit 160 may be configured to also permit the flow of current to the output 120 in response to the 55 Amp current draw falling below the 50 Amp threshold current level of the third current set point within the 2 second threshold period of time of the third current set point.

While the processing circuit 160 may be configured to not interrupt the flow of current in response to the exemplary 55 Amp current draw falling below the 50 Amp threshold current level within 2 seconds, the processing circuit 160 may be configured to terminate the current flow in response to the current draw exceeding 25 Amps for a period of 10 seconds (i.e., in response to the current draw exceeding the threshold current level of the second set point for the threshold period of time for the second set point). By way of example, the processing circuit 160 may be configured to terminate the current flow to the output 120 in response to a current draw of 55 Amps for a period of 1 second and a current draw of 30 Amps for 9 seconds. In other words, the processing circuit 160 may be configured to begin elapsing the threshold periods of time for the various current set points simultaneously in response to the current draw exceeding the corresponding threshold current levels.

While the foregoing example describes an exemplary current draw during an initial startup period of time, the processing circuit 160 may be configured to terminate the flow of current to the output 120 at any point during use of the energy storage and power supply device 100 in response to a current draw exceeding any one of the threshold current levels for the threshold periods of time. In still other embodiments, the processing circuit 160 is otherwise configured to terminate the flow of current to the output 120 based on current draw and time (e.g., in response to an integral of a current draw versus time profile exceeding a threshold level, using an algorithm, etc.).

In response to the current flow at the output 120 initially exceeding the threshold current and thereafter falling below the threshold current level (falling below the threshold current level within the threshold period of time), the processing circuit may be configured to "reset" the timer module(s) measuring the elapsed times that the threshold current levels have been exceeded. The processing circuit 160 may be configured to terminate the flow of current at the output 120 in response to the current flow at the output 120 again exceeding the threshold current for the threshold period of time (i.e., the processing circuit 160 is configured to terminate the flow of current at the output 120 in response to the threshold current level continuously exceeding the threshold period of time). In other embodiments, the threshold period of time is or includes a period of time that may be exceeded within one or more time windows. By way of example, a processing circuit 160 may be configured to terminate the flow of current at the output 120 in response to the current draw exceeding a threshold current level of 25 Amps for a threshold time period of 20 seconds within the previous 60 seconds. The processing circuit 160 may thereby provide overcurrent protection despite momentary reductions in the current draw and/or a current draw profile that, in the aggregate, could result in damage to one or more components of the energy storage and power supply device 10.

By way of example, the current flow at the output 120 may be 55 Amps during an initial startup period of the external device 400. The 55 Amp current draw during the initial startup period may exceed the threshold current level of the first current set point (e.g., 10 Amps, etc.), the second current set point (e.g., 25 Amps, etc.), and the third current set point (e.g., 50 Amps, etc.). Because the 55 Amp current draw exceeds the 50 Amp threshold current level of the third current set point, the processing circuit 160 may terminate the flow of current to the output 120 in response to the initial startup period exceeding the 2 second threshold period of time associated with the third current set point, according to one example. The processing circuit 160 may thereby continue to permit the flow of current to the output 120 until the 50 Amp threshold current level is exceeded for 2 or more seconds.

In other embodiments, one or more of the current set points has a threshold period of time equal to zero. In other words, when the threshold current level of the current set point is reached or exceeded, the processing circuit 160 is configured to immediately terminate the current flow to and/or from the output 120. The processing circuit 160 may thereby operate as a traditional hard stop point, terminating the flow of current at the output 120 if the current flow at the output 120 (e.g., the current draw by the external device 400, etc.) exceeds the threshold current level even briefly.

In one embodiment, the processing circuit 160 and the overcurrent protection circuit 200 cooperate to provide overcurrent protection. According to various embodiments, the overcurrent protection circuit 200 and the overcurrent protection module 184 are configured to operate simultaneously. Similarly, in some embodiments, the overcurrent protection circuit 200 and the overcurrent protection module 184 may be configured to operate any time energy storage and power supply device 100 is in operation. By way of example, either or both of the processing circuit 160 and the overcurrent protection circuit 200 may terminate the flow of current to the output 120. In other embodiments, the energy storage and power supply device 100 does not include the overcurrent protection circuit 200, does not include the regulator 210, and/or the processing circuit is not configured to selectively terminate the flow of current to the output 120.

In these ways, the overcurrent protection circuit 200 and the overcurrent protection module 184 are configured to facilitate operation of an output interface of energy storage and power supply device 100 during surges in the current drawn at the output 120. By combining several current limiters from the overcurrent protection circuit 200, the energy storage and power supply device 100 may construct a current versus time function thereby facilitating effective operation of devices that do not draw a constant current (e.g., and may exceed traditional current limits but only for a brief time, etc.). In some embodiments, outputs of the energy storage and power supply device 100 (e.g., I/O ports 48, etc.) may be separated into alternating current output interfaces having one current versus time function and direct current output interfaces having a second current versus time function (e.g., with different overcurrent protection circuits 200 and/or profiles utilized by the overcurrent protection module 184, etc.).

In one embodiment, the energy storage and power supply device 100 includes one output 120. In other embodiments, the energy storage and power supply device 100 includes a plurality of outputs 120 (e.g., a plurality of the I/O ports 48, etc.). The energy storage and power supply device 100 may include different overcurrent protection circuits 200 and/or regulators 210 for the various outputs 120. The overcurrent protection circuits 200 and/or regulators 210 may use and/or be controlled using different threshold current levels and/or different threshold periods of time that are tailored to each associated output 120. The threshold current levels and/or the threshold periods of time may be different for different outputs 120. In other embodiments, the overcurrent protection circuit 200 and/or the regulator 210 provides overcurrent protection to multiple outputs 120. By way of example, the current flow monitored by the overcurrent protection circuit 200 and/or the processing circuit 160 may include an aggregate of the current flows provided to the various outputs 120. In still other embodiments, sets of overcurrent protection circuits 200 and/or regulators 210 provide overcurrent protection to various groups of outputs (e.g., each group including a number of the I/O ports 48, etc.). For example, one group of overcurrent protection circuits 200 and/or regulators 210 may be associated with outputs that are configured for use in high-current applications (e.g., for starting an air-conditioning unit, etc.), and a second group of overcurrent protection circuits 200 and/or regulators 210 may be associated with outputs that are configured for use in low-current applications. The groups of overcurrent protection circuits 200 and/or regulators 210 may use and/or be controlled using different threshold current levels and/or different threshold periods of time that are tailored to the particular group of outputs 120 (e.g., set points particularly tailored to high-current applications, set points particularly tailored to low-current applications, etc.).

According to an exemplary embodiment, the display module 182 is configured to interpret the input current data (e.g., acquired and/or calculated based on data provided by the input current sensor 192, etc.) and/or the input voltage data (e.g., acquired and/or calculated based on data provided by the input voltage sensor 194, etc.) at the input interface 110 of the energy storage and power supply device 100. The display module 182 may be configured to calculate the electrical power provided by the power supply device 300. In one embodiment, the display module 182 is configured to calculate the electrical power provided by the power supply device 300 by multiplying the input current with the input voltage (e.g., acquired and/or calculated based on data provided by the input current sensor 192, the input voltage sensor 194, etc.). The display module 182 may provide the electrical power data for presentation on a display 162. In other embodiments, the display module 182 provides one or more of the threshold current levels and/or the threshold current periods for presentation on the display 162.

Figure 4:
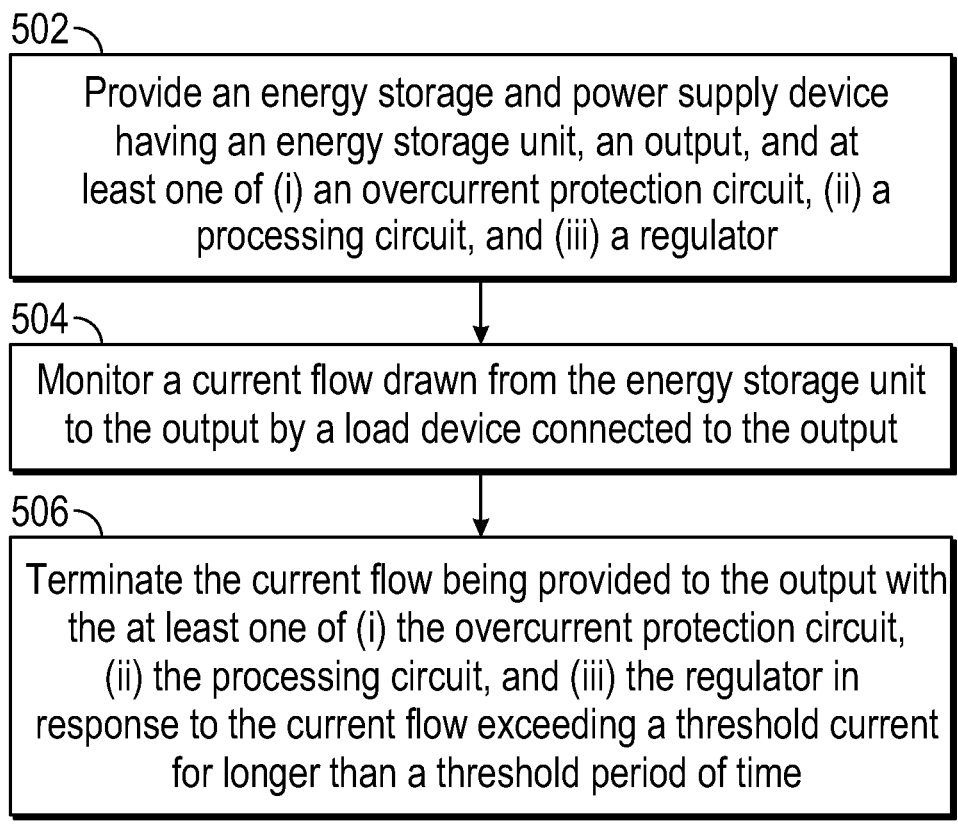
FIG. 4 is a flow diagram of a method for controlling current flow out of an output of an energy storage and power supply device, according to an exemplary embodiment.

Referring now to FIG. 4, a method 500 for controlling current flow out of an output of an energy storage and power supply device is shown, according to an exemplary embodiment. At step 502, an energy storage and power supply device (e.g., the energy storage and power supply device 10, the energy storage and power supply device 100, etc.) including an energy storage unit (e.g., the energy storage unit 30, the energy storage unit 140, etc.), an output (e.g., the output 120, etc.) coupled to the energy storage unit, and at least one of (i) an overcurrent protection circuit (e.g., the overcurrent protection circuit 200, etc.) positioned along a current flow path between the energy storage unit and the output, (ii) a processing circuit (e.g., the processing circuit 160, etc.), and (iii) a regulator (e.g., the regulator 210, etc.) positioned along the current flow path between the energy storage unit and the output is provided.

At step 504, a current flow drawn from the energy storage unit by a load device (e.g., the external device 400, etc.) connected to the output is monitored by at least one of the overcurrent protection circuit and the processing circuit. At step 506, the current flow being provided to the output is terminated with the at least one of (i) the overcurrent protection circuit, (ii) the processing circuit, and (iii) the regulator in response to the current flow exceeding a threshold current for longer than a threshold period of time.

In some embodiments, the energy storage and power supply device only includes the overcurrent protection circuit. The overcurrent protection circuit may include one or more current limiters containing various hardware components (e.g., fuses, operational amplifiers, amplifiers, resistors, other electronic components, etc.) that provide a current protection curve or current protection profile (i.e., hardware-based overcurrent protection). In some embodiments, the energy storage and power supply device only includes the processing circuit and one of the overcurrent protection circuit and the regulator. The processing circuit may provide a signal to the overcurrent protection circuit or the regulator to terminate the current flow according to a current protection curve or current protection profile (various current and time based thresholds) (i.e., software-based overcurrent protection). In some embodiments, the energy storage and power supply device include the overcurrent protection circuit, the processing circuit, and the regulator (i.e., both hardware-based and software-based overcurrent protection).

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as may be recited in appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the energy storage and power supply system as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

The invention claimed is:

1. An energy storage and power supply device, comprising:
   an energy storage unit configured to store electrical energy;
   an output coupled to the energy storage unit and configured to provide an output electrical current to a load; and
   a current limiting system configured to selectively limit the output electrical current according to a current protection profile, wherein the current protection profile includes a plurality of threshold currents and a plurality of corresponding threshold periods of time that facilitate providing the output electrical current according to a maximum variable current versus time function,
   wherein the current limiting system includes an overcurrent protection circuit positioned along a current flow path between the energy storage unit and the output, the overcurrent protection circuit including a plurality of current limiters configured to selectively limit the output electrical current according to the current protection profile;
   wherein each of the plurality of current limiters includes one or more hardware components such that the overcurrent protection circuit provides hardware-based overcurrent protection;
   wherein each of the plurality of current limiters is configured to terminate the output electrical current in response to the output electrical current exceeding a respective threshold current for longer than a corresponding threshold period of time;
   wherein the plurality of current limiters includes a first current limiter and a second current limiter; and
   wherein the first current limiter is configured to terminate the output electrical current in response to the output electrical current exceeding a first threshold current for longer than a first threshold period of time and the second current limiter is configured to terminate the output electrical current in response to the output electrical current exceeding a second threshold current for longer than a second threshold period of time.

2. The energy storage and power supply device of claim 1, wherein the first threshold current is less than second threshold current, and wherein the first threshold period of time is longer than the second threshold period of time.

3. The energy storage and power supply device of claim 2, wherein the second threshold period of time is greater than zero seconds.

4. The energy storage and power supply device of claim 2, wherein the second threshold period of time is zero seconds.

5. The energy storage and power supply device of claim 1, wherein the current limiting system includes:
   a regulator positioned along a current flow path between the energy storage unit and the output; and
   a processing circuit configured to:
      at least one of (i) access a plurality of current set points, each of the current set points including a respective threshold current and a corresponding threshold period of time and (ii) determine a respective threshold current based on a corresponding threshold period of time;

monitor the output electrical current; and send a signal to the regulator to terminate the output electrical current in response to the output electrical current exceeding the respective threshold current for longer than the corresponding threshold period of time for at least one of the current set points.

6. The energy storage and power supply device of claim 5, wherein the processing circuit provides software-based overcurrent protection.

7. A method for controlling an electrical output current from an energy storage unit at an output of an energy storage and power supply device, the method comprising:

providing, by the energy storage unit, the output electrical current to the output of the energy storage and power supply device; and selectively limiting, by a current limiting system of the energy storage and power supply device, the output electrical current according to a current protection profile, wherein the current protection profile includes a plurality of threshold currents and a plurality of corresponding threshold periods of time that facilitate providing the output electrical current according to a maximum variable current versus time function, wherein selectively limiting the output electrical power includes:

accessing, by a processing circuit of the current limiting system, a plurality of current set points, each of the current set points including a respective threshold current and a corresponding threshold period of time;

monitoring, by the processing circuit, the output electrical current; and sending, by the processing circuit, a signal to a regulator positioned along a current flow path between the energy storage unit and the output to terminate the output electrical current in response to the output electrical current exceeding the respective threshold current for longer than the corresponding threshold period of time for at least one of the current set points.

8. The method of claim 7, wherein the current limiting system includes an overcurrent protection circuit positioned along a current flow path between the energy storage unit and the output, the overcurrent protection circuit including a plurality of current limiters configured to selectively limit the output electrical current according to the current protection profile.

* * * * *